United States Patent [19]
Hamb et al.

[11] 3,859,097
[45] Jan. 7, 1975

[54] FILM FORMING POLYMERIC COMPOSITIONS

[75] Inventors: Fredrick L. Hamb; John C. Wilson, both of Rochester, N.Y.

[73] Assignee: Eastman Kodak Company, Rochester, N.Y.

[22] Filed: May 14, 1973

[21] Appl. No.: 360,291

Related U.S. Application Data

[62] Division of Ser. No. 158,526, June 30, 1971, Pat. No. 3,793,249.

[52] U.S. Cl. .................................................. 96/87 R
[51] Int. Cl. ............................................... G03c 1/78
[58] Field of Search ..................................... 96/87 R

[56] References Cited
UNITED STATES PATENTS

| | | | |
|---|---|---|---|
| 2,943,937 | 7/1960 | Nadeau et al. | 96/87 R |
| 3,449,295 | 6/1969 | Conix | 96/87 R |
| 3,698,909 | 10/1972 | Lestina et al. | 96/87 R |
| 3,761,299 | 9/1973 | Lidel | 96/87 R |
| 3,793,249 | 2/1974 | Hamb et al. | 96/87 R |

Primary Examiner—Mary F. Kelley
Attorney, Agent, or Firm—A. H. Rosenstein

[57] ABSTRACT

Novel high molecular weight polymers of 2,2'-spirobi-[chroman]diols, dicarboxylic acids of four or more carbon atoms and other diols which are useful in the preparation of photographic film bases.

9 Claims, No Drawings

FILM FORMING POLYMERIC COMPOSITIONS

This is a division of application Ser. No. 158,526, filed June 30, 1971, now U.S. Pat. No. 3,793,249.

FIELD OF THE INVENTION

This invention relates generally to film-forming polymeric compounds prepared by condensation reactions, and more particularly to film-forming, linear, condensation polymers comprising units of a 2,2'-spirobi[chroman]diol which polymers are useful as supports for photographic emulsions.

BACKGROUND OF THE INVENTION

There is a continuing demand for low cost film-forming materials with improved physical properties which materials can be used as supports for photographic elements. Currently available film-forming compositions that retain good physical characteristics at high temperatures (above 200°C) have not found general acceptance because their manufacture involves expensive materials or difficult procedures. Furthermore, many of these compositions are not readily formed into film by existing procedures and technology.

It is known according to U.S. Pat. No. 2,746,871 that non-polymeric hydroxy spirobi[chromans], including 2,2'-spirobi[chroman]-6,6'-diol, exert a stabilizing effect on hydrocarbons, edible oils and fats. The preparation of polymeric derivatives of these compounds is not disclosed. It is also known according to Czechoslovakian patent 111,355 that epoxy resins of high-thermal stability are produced by reacting epichlorohydrin with hydroxy derivatives of 2,2'-spirobi[chroman] in the presence of alkaline hydroxides. This patent, however, does not disclose the use of such resins as flexible supports for photographic elements that are subjected to high temperature processing. Furthermore, no reference is made to linear condensation polymers of the polyester type.

Thus an improved low cost class of linear condensation polymers incorporating a 2,2'-spirobi[chroman]diyl nucleus and having good film-forming properties and good thermal characteristics, e.g., high glass transition temperatures (Tg), is highly desirable.

SUMMARY OF THE INVENTION

Accordingly it is an object of this invention to provide a novel class of linear condensation polymers and copolymers. Another object of the invention is to provide novel linear condensation polymers and copolymers comprising units of a 2,2'-spirobi[chroman]-7,7'-diyl nucleus which have improved physical properties such as high glass transition temperatures (Tg) and dimensional stability. Another object of this invention is to provide linear polyesters and copolyesters comprising 2,2'-spirobi[chroman]-7,7'-diyl units, diol and dicarboxylic acid units of four or more carbon atoms that can be readily formed into films by existing film casting or extrusion technology. A further object of this invention is to provide novel, film-forming linear polyester and copolyesters comprising 2,2'-spirobi[chroman]-7,7'-diyl units, bisphenol and dicarboxylic acid units of four or more carbon atoms useful as supports for photographic elements which are subjected to high temperature processing. Yet another object of this invention is to provide photographic elements comprising a new and improved support material.

These and other objects and advantages of this invention are obtained from a class of film-forming condensation polymers with improved physical properties which comprises units of a dicarboxylic compound of four or more carbon atoms with units of a bifunctional 2,2'-spirobi[chroman] nucleus having the formula I:

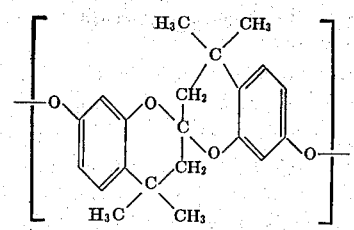

I

In one aspect, linear condensation polymer films made according to this invention can be solvent cast, treated to improve the adhesion of subsequent coatings, and coated with photographic compositions. The resulting photographic elements can be processed at temperatures in excess of 200°C, preferably above at least 220°C, with little or no effect on dimensional stability of the element.

A preferred embodiment according to this invention relates to linear polyester materials comprising dicarboxylic units of four or more carbon atoms esterified with diol units comprising 2,2'-spirobi[chroman]-7,7'-diol units.

Another preferred embodiment of this invention relates to linear polyester materials comprising dicarboxylic units of four or more carbon atoms esterified with diol units comprising 2,2'-spirobi[chroman]-7,7'-diol units and units of a dissimilar diol.

Another preferred embodiment of this invention relates to linear polyester materials comprising units of 2,2'-spirobi[chroman]-7,7'-diol esterified with terephthalic acid units and additionally comprising in copolymerized relationship therewith units of one or more dissimilar diols.

Another preferred embodiment of this invention relates to linear polyester materials comprising units of 2,2'-spirobi[chroman]-7,7'-diol esterified with terephthalic acid units and additionally comprising in copolymerized relationship therewith units of one or more dissimilar dicarboxylic acids.

A further preferred embodiment of this invention relates to linear polyester materials comprising terephthalic acid units esterified with diol units comprising 2,2'-spirobi[chroman]-7,7'-diol units and bisphenol units.

Other useful polymers within the scope of this invention include linear polyester materials comprising units of 2,2'-spirobi[chroman]-7,7'-diol esterified with units of a dicarboxylic acid of four or more carbon atoms and in copolymerized relationship therewith units of one or more dissimilar diols with one or more dissimilar dicarboxylic compounds.

DETAILED DESCRIPTION OF PREFERRED EMBODIMENTS OF THIS INVENTION

The polymers of this invention include 2,2'-spirobi[chroman]-7,7'-diol units and the polymers are represented by the formula II:

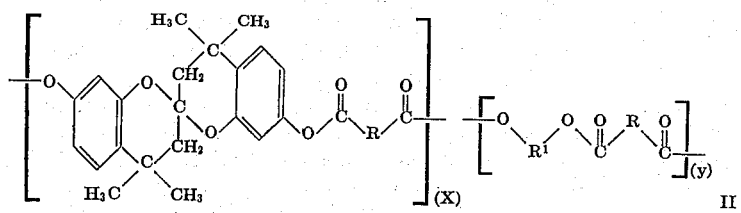

II wherein X represents 1 to 100 mole percent and y, 100-X mole percent, and wherein each R, which can be the same or different, is a radical selected from the group consisting of alkylene radicals of from 2 to 10 carbon atoms, such as ethylene, tetramethyleme, pentamethylene, octamethylene, nonamethylene, and the like; arylene radicals such as o-, m-, or p-phenylene, naphthalene, or anthrylene, unsubstituted or substituted with radicals such as halogen, nitro, cyano, alkyl of 1 to 6 carbon atoms or alkoxy of 1 to 6 carbon atoms; arylenebisalkylene radicals, where the alkylene portion has 1 to 6 carbon atoms, such as phenylenedimethylene, phenylenediethylene, naphthalenedimethylene, naphthalenediethylene and the like; cycloalkylene radicals, such as cyclopentylene, cyclohexylene, norbornylene; alkylenebisarylene radicals, where the alkylene portion contains 1 to 12 carbon atoms, such as ethylene, trimethylene, hexamethylene, decamethylene, dodecamethylene, and the arylene portion is as defined above; alkylidenebisarylene radicals, where the alkylidene portion contains 1 to 12 carbon atoms, such as ethylidene, allylidene, hexylidene and the like, and the arylene portion is as defined above; and arylenealkylene radicals, where the arylene and alkylene portions are as defined above.

The radical R may also be units having the formula

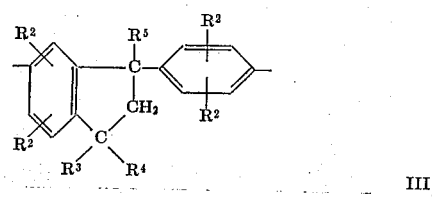

III wherein each $R^2$, which can be the same or different, is selected from the group consisting of hydrogen, aryl radicals such as phenyl, including substituted phenyl, halogen atoms, cyano radicals, nitro radicals, amd alkoxy radicals and wherein the substituents on the phenyl radicals may be a halogen, cyano, nitro or alkoxy. Each $R^3$ and $R^5$ can be a hydrogen atom or an alkyl radical of 1 to 6 carbon atoms, and $R^4$ is an alkyl radical of 1 to 6 carbon atoms.

The radical $R^1$ may be the same as R as defined above, an alkylene radical of 11 or 12 carbon atoms, or it may be represented by the formula IV:

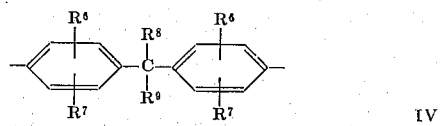

IV wherein each $R^6$ and $R^7$, which can be the same or different, are selected from the group consisting of hydrogen atoms, aryl radicals, such as phenyl, including substituted phenyl, halogen atoms, nitro radicals, cyano radicals, alkoxy radicals and the like, and wherein the substituents on the substituted phenyl may be a halogen atom, nitro radical, cyano radical or alkoxy radical. $R^8$ and $R^9$ represent aliphatic, monocyclic or bicyclic radicals and can each be hydrogen atoms, alkyl radicals of 1 to 6 carbon atoms, including substituted alkyl radicals, such as fluoromethyl, difluoromethyl, trifluoromethyl, dichlorofluoromethyl, 2-[2,3,4,5-tetrahydro-2,2-dimethyl-4-oxofur-3-yl]ethyl, and the like; cycloalkyl radicals of from 4 to 6 carbon atoms, such as cyclohexyl; and aromatic radicals having 6 to 20 carbon atoms, such as phenyl, 3,4-dichlorophenyl, 2,4-dichlorophenyl. $R^8$ and $R^9$ taken together with the carbon atom to which they are attached can represent a monocyclic, bicyclic or heterocyclic moiety having at least 4 atoms in the ring.

A very useful class of linear polyesters of this invention that can be employed as flexible supports for photographic elements subjected to high temperature processing comprises polyesters of recurring units having the formula V:

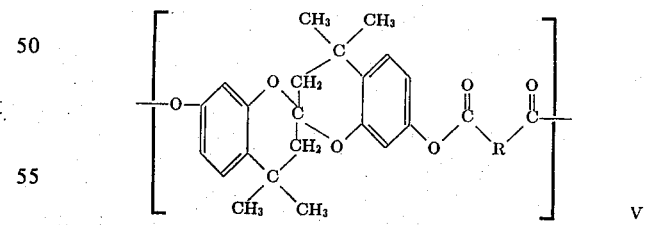

V where R is as defined above.

Another very useful class of linear polyesters of this invention which can be employed as flexible supports for photographic elements subjected to high temperature processing is represented by formula VI:

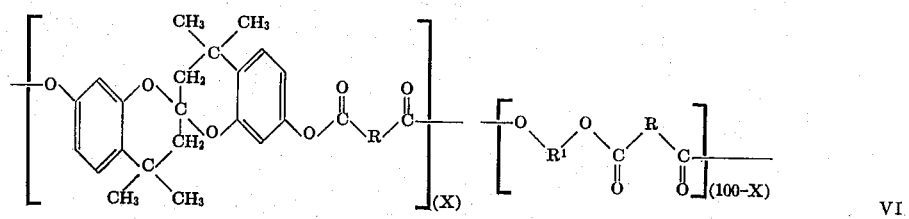

VI wherein R is as described above and is preferably p-phenylene, $R^1$ is as defined hereinabove and is preferably the moiety represented by formula IV and X is an integer of from 5 to 98, preferably 30 to 80.

In formula VI, the 2,2'-spirobi[chroman]-7,7'-diyl portion comprises from about 5 to about 98 mole percent of the linear polyester, that is to say, X is between about 5 percent and about 98 mole percent, depending on the properties desired. In general, the higher the proportion of the 2,2'-spirobi[chroman]-7,7'-diyl portion, the higher the glass transition temperature (Tg). The remaining co-dihydroxy portion of the formula comprises the balance of the linear polyester.

The bifunctional 2,2'-spirobi[chromans] useful in the practice of this invention can be prepared by any method suitable for this purpose. For example, 2,2'-spirobi[chroman]-7,7'-diol can be made in accordance with the procedure of Thompson, U.S. Pat. No. 2,746,871 which comprises reacting resorcinol with acetone in the presence of a mineral acid at ambient temperature for an extended period.

As previously pointed out, condensation polymers according to this invention comprise units derived from bisphenols, monocyclic and polycyclic diols and alkylene glycols. The bisphenols employed in this invention are generally of the structure:

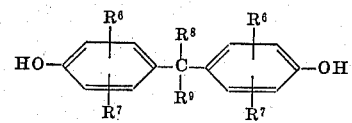

where $R^6$, $R^7$, $R^8$ and $R^9$ are as defined hereinabove.

Typical useful bisphenols include: 2,2-bis(4-hydroxyphenyl)propane; 2,2-bis(4-hydroxy-3,5-dichlorophenyl)propane[tetrachlorobisphenol A]; 1-phenyl-1,1-bis(4-hydroxyphenyl)ethane; 1-(3,4-dichlorophenyl)-1,1-bis(4-hydroxyphenyl)ethane; 2,2-bis(4-hydroxyphenyl)-4-[3-(2,3,4,5-tetrahydro-2,2-dimethyl-4-oxofuryl)]butane; bis (4-hydroxyphenyl)methane; 2,4-dichlorophenylbis(4-hydroxyphenyl)-methane; 1,1-bis(4-hydroxyphenyl)-cyclohexane; 1,1,1,3,3,3-hexafluoro-2,2-bis(4-hydroxyphenyl)propane; and diphenylbis(4-hydroxyphenyl)methane.

Bisphenols of this type are economically attractive since they can generally be produced by the simple reaction mechanism as follows:

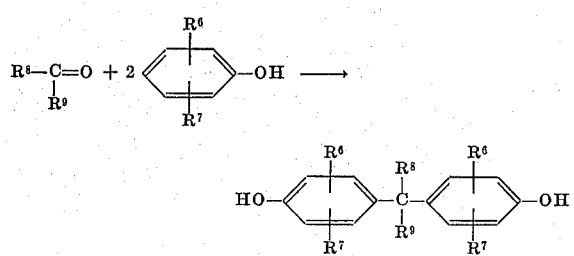

Other useful bisphenols include 1,4-naphthalenediol; 2,5-naphthalenediol; bis(4-hydroxy-2-methyl-3-propylphenyl)methane; 1,1'-bis(2-ethyl-4-hydroxy-5-sec.butylphenyl)ethane; 2,2'-bis(4-hydroxy-2-methyl-5-tert.butylphenyl)propane; 1,1'-bis(4-hydroxy-2-methyl-5-isoctylphenyl)isobutane; and bis-(2-ethyl-4-hydroxyphenyl)-4,4'-di-p-tolylmethane. Still other useful bisphenols are disclosed in U.S. Pat. No. 3,030,335 and Canadian Patent No. 576,491.

Typical monocyclic diols include hydroquinone and hydroquinones substituted with alkyl groups of 1 to 15 carbon atoms or halogen atoms; resorcinol, unsubstituted or substituted with lower alkyl groups or halogen atoms, and the like; 1,4-cyclohexanediol; 1,4-cyclohexanedimethanol; 1,4-cyclohexanediethanol; 1,-4-bis(2-hydroxyethoxy)cyclohexane; 1,4-benzenedimethanol; 1,4-benzenediethanol, and the like.

Exemplary alkylene glycols include ethylene glycol, diethylene glycol, triethylene glycol, 1,2-propanediol, 1,3-propanediol, 1,4-butanediol, 2,3-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4-trimethyl-1,6-hexanediol, and 4-oxa-2,6-heptanediol.

The 7,7'-dihydroxy derivative of 2,2'-spirobi[chroman] according to this invention may be advantageously copolymerized with certain other polycyclic diols in which the polycyclic moiety comprises at least 3 rings to produce linear polyesters. These polymers possess glass transition temperatures (Tg) above 200°C and can be solvent cast to afford layers that can be used as supports for photographic elements that are processed at high temperatures. Useful polycyclic diols of this type include the 1,1'-spirobi[indan]-6,6'-diols disclosed in our copending U.S. Pat. application, Ser. No. 194,506, filed Nov. 1, 1971; now U.S. Pat. No. 3,769,264; the 3,6-dihydroxy-9,9-dimethylxanthenes of our copending U.S. Pat. application, Ser. No. 141,445, filed May 7, 1971 now U.S. Pat. No. 3,775,070; and the 7H-dibenzo[c,h]xanthene-5,9-diols of our cofiled U.S. Pat. application Ser. No. 158,525, filed June 30, 1971 now abandoned.

Dicarboxylic compounds that can be employed to advantage in the practice of this invention include dimethylmalonic acid, succinic acid, glutaric acid, adipic acid, pimelic acid, azelaic acid, sebacic acid, 2-methyladipic acid, diglycolic acid, thiodiglycolic acid, fumaric acid, cyclohexane-1,3-dicarboxylic acid, cyclohexane-1,4-dicarboxylic acid, cyclopentane-1,3-dicarboxylic acid, 2,5-norbornanedicarboxylic acid, (the above described acids being useful either as the cis or trans form), phthalic acid, isophthalic acid, terephthalic acid, t-butylisophthalic acid, phenylenediacetic acid, phenylenedipropionic acid, 2,6-naphthalenedicarboxylic acid, 1,4-naphthalenedicarboxylic acid, 1,5-naphthalenedicarboxylic acid, 1,7-naphthalenedicarboxylic acid, 4,4'-diphenic acid, 4,4'-sulfonyldibenzoic acid, 4,4'-oxydibenzoic acid, binaphthyldicarboxylic acid, 4,4'-stilbenedicarboxylic acid, and 9,10-triptycenedicarboxylic acid.

Although the dicarboxylic acids useful in the practice of this invention can be employed in the free acid form, it is often more advantageous to utilize a bifunctional derivative. For example, the corresponding acid anhydrides may be used where they are available. Other useful bifunctional equivalents include the lower monohydric alcohol or phenyl esters of dicarboxylic acids and the dicarboxylic acid halides, e.g. the chlorides or bromides.

The molecular weight of the linear condensation polymers of this invention can vary over wide ranges, although we have found that polymers having a molecular weight of at least 10,000 are useful. Linear polyester compounds having a molecular weight from about 15,000 to 50,000 are particularly desirable. The compounds of this invention are further characterized by their inherent viscosities. Generally, the subject film-forming polyesters of this invention have an inherent viscosity of about 0.4 to about 1.2 and the polyesters preferred as supports for photographic elements processed at high temperatures have an inherent viscosity of about 0.6 to about 0.8.

The glass transition temperatures (Tg) of the polymers of this invention can be determined by differential thermal analysis as disclosed in "Techniques and Methods of Polymer Evaluation," Vol. 1, Marcel Dekker, Inc., N.Y., 1966.

Film-forming as used in this invention refers to a material which will provide a self-supporting film of the material when cast or extruded, for example, when cast in sheets of from 1 to 7 mils thickness.

It is appreciated, of course, that the physical properties of the broad class of novel polymers of this invention such as, for example, the glass transition temperature (Tg), yield strength, break strength, Young's modulus and the like, can be varied over a wide range. Polymers with properties in a particular range can be easily obtained by judicious selection of appropriate diol and dicarboxylic components and suitable mixtures thereof. The proper choice and proportions of the monomeric components can be determined by simple test procedures well known to those skilled in the art of making condensation polymers. A useful class of polymers according to this invention with good thermal and mechanical properties comprises units of terephthalic acid esterified with diol units consisting of about 10 to about 98 mole percent, preferably about 10 to 50 mole percent, of 2,2'-spirobi[chroman]-7,7'-diol units and about 90 to about 0 mole percent, preferably about 90 to 50 mole percent of bisphenol units.

Generally any procedure known in the art for making linear condensation polymers can be used in preparing the polymers of this invention. The following are examples of processes that may be utilized to produce the linear polyesters of this invention.

a. The interfacial procedure can be utilized to make the polymers. A preferred embodiment with regard to the materials, solvents and catalysts is shown in Example 1. The preferred time of reaction is a function of all other variables and, as such, is governed by the viscosity desired for the polymer. Generally, the reaction can be monitored by sampling and thus the preferred polymerization time chosen. When methylene chloride is employed as the solvent in certain embodiments, the preferred temperature is 35°C with a useful temperature range from about 10°C to 40°C, such limits being governed on the one hand by maintaining a practical rate of reaction and on the other by the boiling point of the solvent. A variety of solvents may be employed to provide a broader range of temperatures and solubilities as desired. Other suitable solvents are chloroform, dichloroethane, propylene dichloride and the like.

b. Polymers according to this invention can be prepared by a solution procedure whereby the 2,2'-spirobi[chroman]diol and bisphenol reactants and the dicarboxylic acid halide, e.g. chloride or bromide, are placed in solution in the presence of an acid acceptor such as, for example, pyridine. The acid acceptor can also be present in excess and thus serve also as the solvent.

c. The ester interchange procedure of synthesizing polymeric esters both by the melt process and the powder process can advantageously be used to make the polyesters of this invention, particularly for those copolymers which can be crystallized. In a preferred embodiment, these techniques may be used in combination with a solvent crystallization step to afford film-forming polyesters having improved physical properties including high softening temperatures and high molecular weights. The solvent crystallization procedure generally involves contacting melt process polymer with a solvent at ambient temperatures. Suitable solvents include acetone, 2-pentanone, ethyl acetate, acetic acid, toluene and the like. The treated material is separated from the solvent by any conventional procedure and put through the powder process. The melt process is advantageously conducted in the presence of a catalytic agent. Useful catalysts for the transesterification reactions include the carbonate, oxide, hydroxide, hydride and alkoxide of an alkali metal or an alkaline earth metal, a compound of a Group IVA metal of the Periodic Table, e.g., titanium isopropoxide, organometallic halides and complex alkoxides such as NaHTi(OC$_4$H$_9$)$_2$ and the like.

The film-forming materials of this invention can be generally extruded or cast into flexible supports and used in various layer arrangements and structural combinations. Generally, the flexible supports of this invention are treated by any convenient method to improve the adhesion of superimposed coatings or layers. Useful procedures include subbing with conventional subbing agents for polyester supports, contacting with a chemical agent such as sulfuric acid, electron bombardment, treating with a reactive gas according to the procedure of Lidel, U.S. Ser. No. 80,482, filed Oct. 13, 1970 now U.S. Pat. No. 3,761,299 and Belgian Pat. No. 736,993, and the like. The film-forming polyesters of this invention are used to advantage as flexible supports for photographic silver halide and other light-sensitive systems as well as for multilayer elements used in color photographic silver halide and other light-sensitive systems as well as for multilayer elements used in color photography and diffusion transfer processes.

In a preferred embodiment, a support of a polyester of this invention having a glass transition temperature above 200°C is used as the film support in photographic elements which are heat-processed or heat-stabilized. In particular, one preferred embodiment relates to photographic elements comprising the supports of this invention having at least one layer of a photographic emulsion which contains silver halide grains having polyvalent ions occluded therein as disclosed in Bacon et al, U.S. Pat. No. 3,447,927. Elements of this type can be processed according to Colt, U.S. Pat. No. 3,418,122, issued Dec. 24, 1968.

The following examples illustrate the preparation of the polymers of this invention.

EXAMPLE 1

Polymerization of 7,7'-Dihydroxy-4,4,4',4'-tetramethyl-2,2'-spirobi[chroman] and Terephthaloyl Chloride, Interfacial Process This polymer is prepared by the interfacial technique by combining the reactants in a blender. 7,7'-Dihydroxy-4,4,4',4'-tetramethyl-2,2'-spirobi[chroman] (3.4g, 0.01 moles) is added to a mixture of 40 ml (0.02 moles) of 0.5 normal sodium hydroxide solution and 20 ml of water. While stirring slowly, two drops of tri-n-butylamine are added. With rapid stirring, a solution of 2.03g (0.01 moles) of terephthaloyl chloride in 50 ml of methylene chloride is added. After 1½hours, the mixture is acidified with acetic acid and poured into methanol. The white, fibrous precipitate is isolated and washed with methanol, filtered and dried at 80°C in a vacuum oven. The solid has an inherent viscosity in chloroform of 0.34 and a glass transition temperature of 260°C.

Unless otherwise specified all inherent viscosities are measured at 25°C at a concentration of 0.25g of polymer per 100 ml of solution. The solvent of choice in the remaining examples is a mixture of 1:1 by weight of phenol:chlorobenzene.

Other polyesters of 7,7'-dihydroxy-4,4,4', 4'-tetramethyl-2,2'-spirobi[chroman] having high glass transition temperatures and employing different dicarboxylic acids are prepared by the interfacial procedure in the manner of Example 1. The acids used and the physical characteristics of the polymers are shown in Table I.

Table I

| Ex. No. | Acid | Inh. Visc. | Tg°C |
|---|---|---|---|
| 2 | Isophthalic | 0.27 | 232 |
| 3 | Adipic | 0.06 | 121 |
| 4 | 1,1,3-Trimethyl-5-carboxy-3-(p-carboxyphenyl)indan | 0.34 | 281 |

It is seen that a glass transition temperature much below 200°C is obtained when a straight chain alkylene dicarboxylic acid such as adipic acid is employed in the preparation of a polymer of this invention. Thus, as indicated hereinbefore, dicarboxylic acids other than polymethylene dicarboxylic acids are preferred for the polyesters of this invention.

As indicated hereinabove, a useful class of polyesters according to this invention comprises units of 2,2'-spirobi[chroman]-7,7'-diol esterified with units of a dicarboxylic compound and additionally comprising in copolymerized relationship therewith units of a dissimilar diol. Generally, desirable increases in the glass transition temperature (Tg) of members of this class of copolyesters are achieved by reducing the mole percent of dissimilar diol employed in the polymerization.

EXAMPLE 5

Polymerization of 50 Percent 7,7'-Dihydroxy-4,4,4', 4'-tetramethyl-2,2'-spirobi[chroman], 50 Percent 4,4'-Isopropylidenediphenol, and Terephthaloyl Chloride, Interfacial Process This polymer is prepared in a manner similar to that of Example 1 using the following reactants:

3.40g (0.01 moles) of 7,7'-dihydroxy-4,4,4', 4'-tetramethyl-2,2'-spirobi[chroman],
2.28g (0.01 moles) of 4,4'-isopropylidenediphenol,
80 ml (0.04 moles) of 0.5 normal sodium hydroxide,
70 ml of distilled water,
3 drops of tri-n-butylamine, and
4.06g (0.02 moles) of terephthaloyl chloride in 50 ml of methylene chloride.

After stirring the reactants for two hours in a blender, the mixture is made acidic and poured into methanol to yield a fibrous, white solid. After washing well and drying, the product has an inherent viscosity of 0.61 and a glass-transition temperature of 259°C.

EXAMPLE 6

A series of copolymers employing the diol components of Example 5 in different ratios are prepared according to the procedure of that example. In this series the total number of moles of diol component is always equal to the total number of moles of diacid component. The mole ratios of the diols used and the physical properties of the polymers are shown in Table II.

Table II

| Mole ratio X:Y* | Inh. Visc. | Tg(°C) |
|---|---|---|
| 25:75 | 0.56 | 243 |
| 75:25 | 0.25 | 256 |

X — 7,7'-dihydroxy-4,4,4',4'-tetramethyl-2,2'-spirobi[chroman]
Y — 4,4'-Isopropylidenediphenol It has been mentioned previously that the condensation polymers of this invention are employed to advantage in the preparation of flexible films. Certain of these films, prepared from polyesters of this invention that have glass transition temperatures above about 200°C, and preferably above 220°C, are especially useful as flexible supports for photographic elements that are processed at high temperatures. Film formation by solvent casting and the preparation of a photographic product for high temperature processing are typically illustrated by Examples 7 and 8 respectively.

EXAMPLE 7

A solution of the polyester 2,2'-spirobi[chroman]-7,7'-diyl:4,4'-isopropylidenediphenylene terephthalate from Example 5 is prepared in chloroform at a concentration of approximately 20 weight percent. This solution is coated onto a Teflon-coated glass plate and allowed to dry at 25°C overnight. The film is then heated at 40°C for two hours, at 60°C for two hours and finally at 70°C overnight. The film a clear, colorless product, is removed from the plate and cut into strips one inch by eight inches. The final film thickness is 13 mils. The film has the following physical properties:

| | |
|---|---|
| Film Thickness | 13 mils |
| Young's Modulus | $2.1 \times 10^5$ psi |
| Yield Strength | $4.92 \times 10^3$ psi |
| Yield Elongation | 4.25 Percent |
| Break Strength | $5.1 \times 10^3$ psi |
| Break Elongation | 8.75 Percent |

EXAMPLE 8

A strip of the film prepared in Example 7 is treated with $N_2O_3$ according to the procedure of Lidel, referred to hereinabove, to promote adhesion of the photographic emulsion that is applied in the next step. The treated strip is coated with a light-sensitive printout emulsion prepared according to the procedure of Bacon et al., referred to hereinabove. The emulsion coating has a thickness of 4 mils. The dried coated film shows very good adhesion of the photographic emulsion to the support. The cured product shows a heat distortion temperature of 260°C when placed on a heated mantle.

Films prepared from the linear condensation polymers of this invention are highly useful as flexible supports for photographic silver halide emulsions which must be processed at elevated temperatures. Similarly, films prepared from the polymers of this invention can be employed as flexible supports for light-sensitive photographic elements that are processed solely by the application of heat. The polymers of this invention find further use as supports for light-sensitive colloid layers such as are employed in image transfer processes in lithography, and the like. The high temperature characteristics and dimensional stability of the subject polymers make them suitable as supports for photoresists such as those utilized in the preparation of printed circuits, and the like. Additionally, the polymeric compositions of this invention can be solvent cast, extruded or moulded and are therefore useful as fibers, as components of tire cord, lacquers, molding resins, engineering plastics and the like.

Polymeric compositions according to this invention are advantageously prepared by standard techniques using well-known industrial processes. The compounds employed in making the polymers of this invention are prepared from readily available, inexpensive materials. A further advantage of the polymers of this invention is that they may be readily formed into film using procedures consistent with commercially available equipment.

The invention has been described in detail with particular reference to preferred embodiments thereof, but it will be understood that variations and modifications can be effected within the spirit and scope of the invention.

We claim:

1. A photographic element comprising a photographic emulsion coated on a film of a linear polymer comprising the reaction product of a 2,2'-spirobi(chroman)7,7'-diol and a dicarboxylic acid of four or more carbon atoms.

2. The element of claim 1 wherein said acid is terephthalic acid.

3. The element of claim 1 wherein said linear polymer comprises the reaction product of a 2,2'-spirobi(chroman) 7,7'-diol, a dicarboxylic acid of four or more carbon atoms and a diol selected from the group consisting of aliphatic diols, aromatic diols and bisphenols.

4. The element of claim 3 wherein the dicarboxylic acid is terphthalic acid.

5. The element of claim 3 wherein the diol is an aliphatic diol.

6. The element of claim 3 wherein the diol is an aromatic diol.

7. The element of claim 3 wherein the diol is a bisphenol.

8. A photographic element comprising a photographic emulsion on a film of a polymer comprising recurring units having the formula:

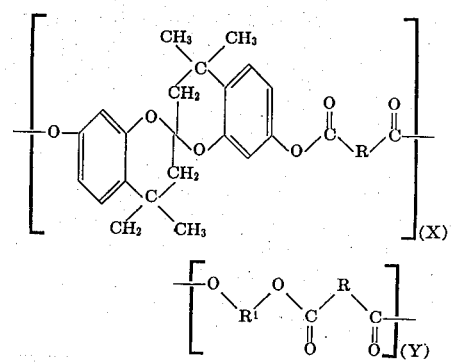

wherein $x$ is 1 to 100 mole percent and $y$ is 100-$x$ mole percent, $R^1$ is a radical selected from the group consisting of alkylene radicals of from 2 to 12 carbon atoms, cycloalkylene radicals, arylene radicals, substituted arylene radicals wherein the substituents are halogen, nitro, cyano, alkoxy of 1 to 6 carbon atoms and alkyl radicals of 1 to 6 carbon atoms, arylenebisalkylene radicals having 1 to 6 carbon atoms in the alkylene portion, alkylenebisarylene radicals having 1 to 12 carbon atoms in the alkylene portion, alkylidenebisarylene radicals having 1 to 12 carbon atoms in the alkylidene portion, and arylenealkylene radicals having 1 to 12 carbon atoms in the alkylene portion; and each R, which can be the same or different, is a radical selected from the group consisting of alkylene radicals of from 2 to 10 carbon atoms, arylene radicals, substituted arylene radicals wherein the substituents are halogen, nitro, cyano, arylenebisalkylene radicals having 1 to 6 carbon atoms in the alkylene portion, cycloalkylene radicals, alkylenebisarylene radicals having 1 to 12 carbon atoms in the alkylene portion, alkylidenebisarylene radicals having 1 to 12 carbon atoms in the alkylidene portion and arylenealkylene radicals having 1 to 12 carbon atoms in the alkylene portion.

9. A photographic element comprising a photographic emulsion on a film of a polymer comprising recurring units having the formula:

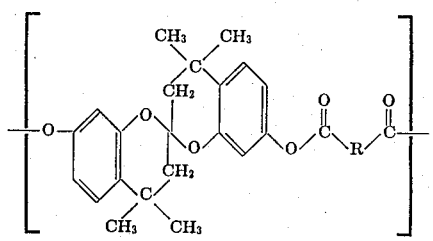

wherein R is a radical selected from the group consisting of alkylene radicals of from 2 to 10 carbon atoms, arylene radicals, substituted arylene radicals wherein the substituents are halogen, nitro, cyano, alkyl of 1 to 6 carbon atoms, and alkoxy, arylenebisalkylene radicals having 1 to 6 carbon atoms in the alkylene portion, cycloalkylene radicals, alkylenebisarylene radicals having 1 to 12 carbon atoms in the alkylene portion, alkylidenebisarylene radicals having 1 to 12 carbon atoms in the alkylidene portion, and arylenealkylene radicals having 1 to 12 carbon atoms in the alkylene portion.

* * * * *